June 29, 1943. S. MURATA 2,323,072
FRAME FOR GLARE SHIELDS
Original Filed Feb. 18, 1939
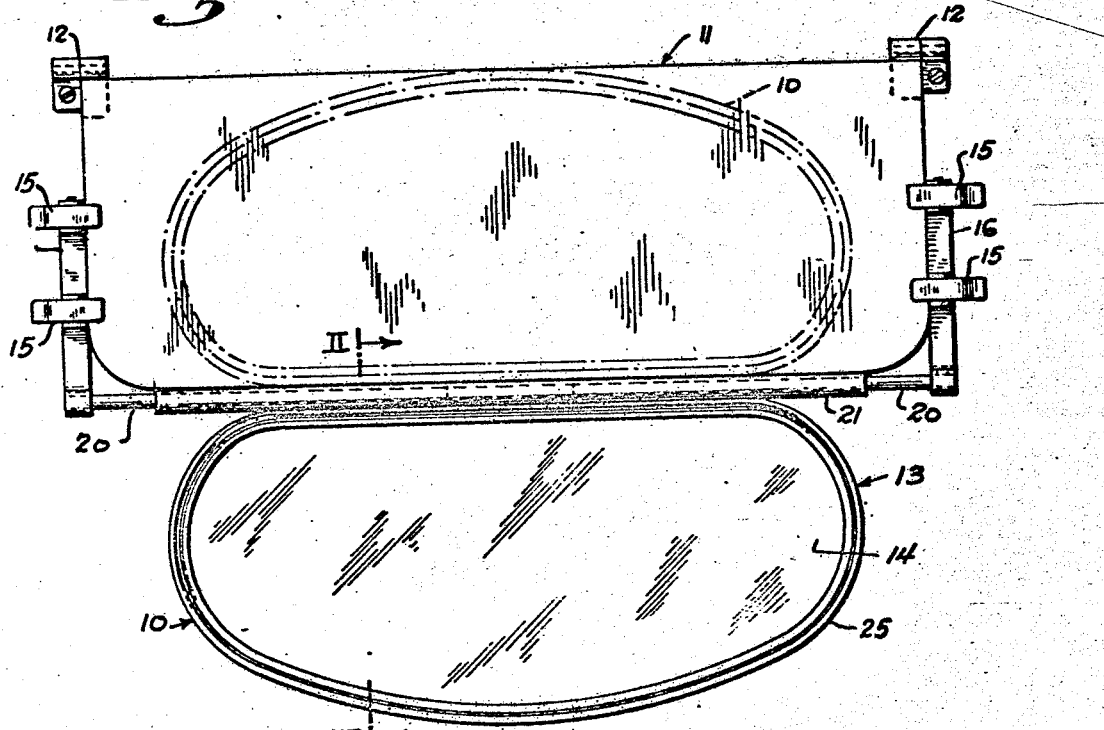
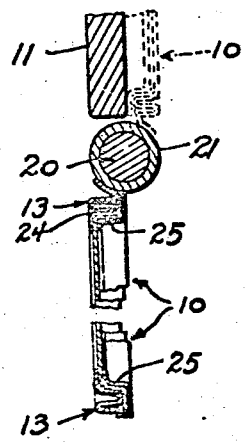
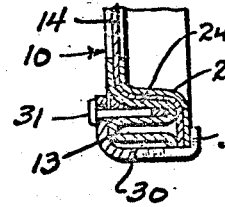
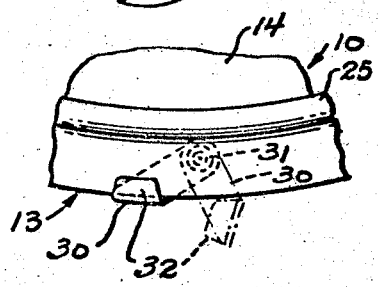
INVENTOR
Seizo Murata.
BY Castberg & Roemer.
ATTORNEYS.

Patented June 29, 1943

2,323,072

UNITED STATES PATENT OFFICE 2,323,072

FRAME FOR GLARE SHIELDS

Seizo Murata, San Francisco, Calif.

Original application February 18, 1939, Serial No. 257,093, now Patent No. 2,244,959, dated June 10, 1941. Divided and this application January 21, 1941, Serial No. 375,300

1 Claim. (Cl. 296—97)

The present invention relates to frames for glare shields, and the present application is a division of my co-pending application entitled "Glare shield," filed February 18, 1939, Serial No. 257,093, which issued on June 10, 1941, and bears Patent No. 2,244,959.

The invention is particularly concerned with glare shields such as are customarily used in automobiles to protect the eyes of the driver from unusual glare or bright lights, and refers particularly to a frame for a glare shield, the construction of which permits ready change of the filter material that is employed, so that the shield may be adapted to suit the particular taste or requirements of any individual.

It is the object of this invention to provide a glare shield of simple and inexpensive construction in which the filter medium may be conveniently removed and replaced in case it becomes damaged or worn, or in case it is desired to change the color or other filtering properties of the medium.

One form of the invention is illustrated in the accompanying drawings and described in detail in the following specification, wherein reference is made to the drawing and further objects and advantages of the invention are made apparent.

In the drawing—

Fig. 1 is a front elevation of a glare shield embodying the present invention and illustrated as attached to a conventional sunshade of an automobile;

Fig. 2 is an enlarged sectional view taken along line II—II of Fig. 1, and illustrating the construction which makes possible convenient removal of the filtering medium;

Fig. 3 is an enlarged sectional view of the frame shown in Fig. 2, illustrating a locking means attached thereto; and Fig. 4 is an enlarged fragmentary view in elevation of the same.

As shown in the accompanying drawing, and as fully described in my co-pending application hereinabove referred to, the glare shield generally indicated at 10 is attached to a conventional sunshade 11 which is customarily secured just above the driver's compartment of an automobile by means of pivotal supporting brackets indicated at 12. Through the medium of these brackets the sunshade 11 may be swung to a horizontal position against the ceiling of the driver's compartment when it is not in use or lowered to the vertical position shown in Fig. 1 when the driver is annoyed by the direct rays of the sun.

The glare shield comprises a frame 13 embracing a sheet or membrane of a filter medium 14 and is pivotally connected along the lower edge of the sunshade by means of an adjustable bracket including clips 15 and plates 16 supporting rods 20 which extend into opposite ends of a tube 21 to which the frame 13 of the glare shield is secured. The bracket and pivotal support which are described in detail in my co-pending application referred to above permit the glare shield to be swung from the full line position illustrated in Fig. 1 when it is in use to the dotted line position therein illustrated when it is not being used.

The frame 13 which embraces the filter medium 14 is secured to the tube 21 as shown in Fig. 2 by welding, soldering, or any other suitable fastening means. Any light filtering medium may be used within the frame, although a non-shatterable filter medium is preferred, and any of several cellulose or plastic base compositions are suitable for this purpose and may be obtained in different colors to suit the requirements of the individual driver.

In order to provide a great range in filter mediums, I have found it desirable to use a very thin substance of the nature of "Cellophane," which is available in a large variety of colors, and of which more than one thickness may be used, as well as more than one color, so that the user may adapt the glare shield to his own particular needs by placing in the frame any color or combinations of colors, and any number of thicknesses of the filter medium that he desires.

In order that the filter medium may readily be changed, I have provided a frame the construction of which is illustrated in Fig. 3, in which the main frame portion 13 is formed preferably of pressed metal or the like, with a cross section which provides an inclined surface 24 surrounding the frame opening. A clamping frame 25, also preferably constructed of pressed metal, fits within the frame 13 and causes the filter medium 14 to be gripped around its periphery at the inclined surface 24 and tightly stretched across the frame opening. The clamping frame 25 is frictionally held in this position and may be removed for the purpose of removing or replacing the filter medium 14. Where thin sheets of colored material such as "Cellophane" are used as a filter medium, more than one sheet may readily be placed in the frame constructed in the manner just described, so that it is possible to increase the thickness, to combine colors, or otherwise to vary the filtering properties of the glare shield.

Ordinarily the frictional contact between the frame 13 and the clamping frame 25 will suffice to retain these frames against separation. In order positively to prevent their separation, which might otherwise be caused by the jarring motion of the automobile or the slippery texture of the filter medium, I have provided a locking means, illustrated in Figs. 3 and 4. This locking means comprises a U-shaped locking member 30 mounted on a pin 31 which extends into and is preferably held in one of the grooves of the frame 13 by means of solder or the like. A finger 32 which forms one end of the locking member 30 is arranged to overlap the outer edge of the clamping frame 25 when the locking member is swung to the full line position illustrated in Fig. 4, and to swing free of said edge when the locking member is pivoted about its pin 31 to assume the dotted line position therein shown. Such locking members may be employed in any desired number at suitably spaced intervals around the edge of the frame to secure the clamping frame against accidental removal.

The foregoing description is directed to a more or less specific form of the invention for purposes of illustration, but it is to be understood that the invention is limited, not by the specific form shown and described, but only by the scope of the appended claim.

Having thus described my invention, what I claim and desire to secure by Letters Patent is:

A frame for a glare shield or the like comprising one frame member with an inclined surface and a second frame member with a complementary surface whereby a membrane of light filtering material may be stretched over the frame upon bringing the frame members together, and U-shaped locking members pivoted to one frame member and having a portion adapted to overlie the other to prevent separation of the frame members.

SEIZO MURATA.